US006701014B1

(12) United States Patent
Syeda-Mahmood

(10) Patent No.: US 6,701,014 B1
(45) Date of Patent: Mar. 2, 2004

(54) METHOD AND APPARATUS FOR MATCHING SLIDES IN VIDEO

(75) Inventor: Tanveer Fathima Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 09/593,205

(22) Filed: Jun. 14, 2000

(51) Int. Cl.[7] .............................. G06K 9/48; G06K 9/46; G06K 9/68; G06F 17/30
(52) U.S. Cl. ........................ 382/199; 382/203; 382/218; 707/6
(58) Field of Search ................................. 382/163, 165, 382/190, 195, 199, 203, 209, 217, 218, 224; 345/719, 721, 723; 707/3, 6

(56) References Cited

U.S. PATENT DOCUMENTS

| 5,845,288 | A | * | 12/1998 | Syeda-Mahmood | ......... | 707/102 |
| 6,236,395 | B1 | * | 5/2001 | Sezan et al. | ................ | 345/723 |
| 6,366,296 | B1 | * | 4/2002 | Boreczky et al. | ........... | 345/719 |
| 6,404,925 | B1 | * | 6/2002 | Foote et al. | ................ | 382/224 |
| 6,434,269 | B1 | * | 8/2002 | Hamburg | .................... | 382/163 |
| 6,507,838 | B1 | * | 1/2003 | Syeda-Mahmood | ............ | 707/3 |

OTHER PUBLICATIONS

Flickner et al, Query by Image and Video Content: The QBIC System, Sep. 1995, IEEE Paper ISSN: 0018–9162, vol. 28, Issue 9, pp. 23–32.*
Multimedia Access and Retrieval: The State of the Art and Future Direction, ACM Multimedia, 1999, ACM 1–58113–151–8, pp. 443–445.*
Tanveer Fathima Syeda–Mahmood, Indexing Colored Surface in Images, 1996, IEEE Paper ISBN: 1015–4651, pp. 8–12.*
Marefat et al, "A Framework for Image Interpretation in Manufacturing Applications", Jun. 1990, IEEE Paper ISBN: 0000–0569, pp. 569–574.*
"Locating Indexing Structures in Engineering Drawing Database using Location Hashing", Tanveer Syeda–Mahmood, INBM Almaden Research Center, 1999 IEEE, pp. 49–55.
"Passive Capture and Structuring of Lectures", Sugata Mukhopadhyay, Brian Smith, Department of Computer Science Cornell University, pp. 477–487.
"A Maximum Likelihood Model For Topic Classification Of Broadcast News", Richard Schwartz, Toru Imai, Francis Kubala, Long Nguyen, John Makhoul, BBN Systems and Technologies, 5 pages.
"Combining Color and Geometric Information for the Illumination Invariant Recognition of 3–D Objects", David Slater and Glenn Healey, Department fo Electrical and Computer Engineering University of California, 1995 IEEE, pp. 563–568.
"The Combinatories of Object Recognition in Cluttered Environments using Constrained Search", W. Eric L. Grimson, Artificial Intelligence Laboratory and Department of Electrical Engineering and Computer Science Massachusetts Institute of Technology, 1988 IEEE, pp. 218–249.
"Topic–Based Browsing Within a Digital Library Using Keyphrases", Steve Jones and Gordon Paynter, Department of Computer Science The University of Waikato, pp. 114–121.

(List continued on next page.)

Primary Examiner—Mehrdad Dastouri
(74) Attorney, Agent, or Firm—McGinn & Gibb, PLLC; Khanh Q. Tran, Esq.

(57) ABSTRACT

The present invention performs a method for matching slides to video comprising, generating keyframes from the video, extracting geometric keyframe features from the keyframes and geometric slide features from the slides, and matching the geometric slide features and the geometric keyframe features.

23 Claims, 3 Drawing Sheets

OTHER PUBLICATIONS

"Topic Labeling of Multilingual Bradcast News in the Information Digital Video Library", Alexander G. Hauptmann, F Danny Lee and Paul E. Kennedy, Sample EACL 1999 Submission, 6 pages.

"Color Constant Color Indexing", IEEE Transactions on Pattern Analysis and Machine Intelligence, vol. 17, No. 5, May 1995, pp. 522–529.

"Teaching and Learning as Multimedia Authoring: The Classroom 2000 Project", Gregory D. Abowd, Christopher G. Atkeson, Ami Feinstein, Cindy Hmelo, Rob Kooper, Sue Long, Nitin "Nick" Sawhney and Mikiya Tani, pp. 1–12.

"Improved Algorithms for Topic Distillation in a Hyperlinker Enviornment", Krishna Bharay amd Monika R. Henzinger, Digital Equiptment Corporation Systems Research Center, pges 104–111.

"CueVideo: Automated video/audio indexing and browsing", Arnon Amir, Savithja Srinivasan, Dulce Ponceleon and Dragutin Petkovic, IBM Almaden Research Center, pp. 326–327.

* cited by examiner

METHOD AND APPARATUS FOR MATCHING SLIDES IN VIDEO

BACKGROUND OF THE INVENTION

1. Field of the Invention

The present invention generally relates to an invention of matching electronic slides or the images contained in electronic slides to their appearance in a video stream.

2. Description of the Related Art

Detecting and recognizing slides or transparencies used by a speaker in a video is important for detecting teaching-related events in video. This is particularly important in the domain of distributed or distance learning whose long-standing goal has been to provide a quality of learning comparable to the face-to-face environment of a traditional classroom for teaching or training. Effective preparation of online multimedia courses or training material for users is currently ridden with problems of high cost of manual indexing, slow turnaround, and inconsistencies from human interpretation. Automatic methods of cross-linking and indexing multimedia information are very desirable in such applications, as they can provide an ability to respond to higher level semantic queries, such as for the retrieval of learning material relating to a topic of discussion. Automatic cross-linking multimedia information, however, is a non-trivial problem as it requires the detection and identification of events whose common threads appear in multiple information modalities. An example of such an event are points in a video where a topic was discussed. From a survey of the distance learning community, it has been found that the single most useful query found by students is the querying of topic of interest in a long recorded video of a course lecture. Such classroom lectures and talks are often accompanied by foils (also called slides) some of which convey the topic being discussed at that point in time. When such lectures are video taped, at least one of the cameras used captures the displayed slide, so that the visual appearance of a slide in video can be a good indication of the beginning of a discussion relating to a topic.

The recognition of slides in the video, however, is a challenging problem for several reasons. First, the imaging scenario in which a lecture or talk was taped could be of a variety of forms. There could be a single camera looking at the speaker, the screen showing the slide, and the audience. Also, the camera often zooms or pans. Alternately, a single camera could be dedicated to looking at the screen, or the overhead projector where the transparency is being displayed, while another camera looks at the speaker. The final video in this case, may have been edited to merge the two video streams.

Thus, the slide appearing in a video stream could consume an entire video frame or be a region in a video frame. Secondly, depending on the distance between the camera and the projected slide, the scale at which the slide image appears in the video could be reduced, making it difficult to read the text on slide and/or making it hard to detect text using conventional text recognition methods. Additionally, the color on the slides undergoes transformation due to projection geometry, lighting conditions of the scene, noise in the video capture and MPEG conversion. Finally, the slide image often appears occluded and/or skewed. For example, the slide image may be only partially visible because another object (eg., person giving the talk) is covering or blocking the slide image.

Previous approaches of slide detection have worked on the premise that the camera is focused on the slides, so that a simple change detection through frame subtraction can be used to detect changes in slides. There has been some work done in the multimedia authoring community to address this problem from the point of synchronization of foils with video. The predominant approach has been to do on-line synchronization using a structured note-taking environment to record the times of change of slide electronically and synchronize with the video stream. Current presentation environments such as Lotus Freelance or Powerpoint have features that can also record the change time of slides when performed in rehearse modes. In distributed learning, however, there is often a need for off-line synchronization of slides since they are often provided by the teacher after a video recording of the lecture has been made. The detection of foils in a video stream under these settings can be challenging. A solution to this problem has been proposed for a two-camera geometry, in which one of the cameras was fixed on the screen depicting the slide. Since this was a more-or-less calibrated setting, the boundary of the slide was visible so that the task of selecting a slide-containing region in a video frame was made easy. Further, corners of the visible quadrilateral structure could be used to solve for the 'pose' of the slide under the general projective transform. Therefore, there is a need for a system which can recognize slides, regardless of whether the slides are distorted, blurred, or partially blocked. A system and process for "recognizing" slides has not been explored before. The inventive approach to foil detection is meant to consider more general imaging situations involving one or more cameras, and greater variations in scale, pose and occlusions.

Other related art includes the principle of geometric hashing and its variants[Lamdan & Wolfson, Proc. Int. Conf. Computer Vision,(ICCV) 1988, Rigoustous and Wolfson, Spl. Issue on geometric hashing, IEEE Computational Science and Engg., 1997, Wolfson, "On curve matching" in IEEE Transactions Pattern Analysis and Machine Intelligence, vol. 12, pp.483–489, 1990 incorporated herein by reference], that has been applied earlier to the problem of model indexing in computer vision, and the related technique of location hashing that has also been disclosed earlier [Syeda-Mahmood, Proc. Intl. Conf. Computer Vision and Pattern Recognition, CVPR 1999, incorporated herein by reference].

SUMMARY OF THE INVENTION

It is, therefore, an object of the present invention to match electronic slides to their appearance in a video stream. This is accomplished by first generating a set of keyframes from the video stream. Next, likely matches of electronic slide images and images in the keyframes are identified by color-matching the slide images with regions on the keyframes. Next, the geometric features of slide images are extracted from the slides. Geometric features are also extracted from the regions within keyframes. The invention reduces the structure of the slide images and the keyframe images to a corresponding set of affine coordinates. The invention places the slide image affine coordinates in a balanced binary search tree called hash tree for efficiency of search.

The invention matches the slide images and keyframe images by indexing the hash tree with the keyframe image affine coordinates. When matches to the keyframe image affine coordinates are found in the hash tree, the invention records hits in a histogram. Lastly, each keyframe is paired with the slide image with the most hits, and the paired keyframe is designated as containing the corresponding slide image.

In summary, the present invention performs a method for matching slides to video comprising, generating keyframes from the video, extracting geometric keyframe features from the keyframes and geometric slide features from the slides, and matching the geometric slide features and the geometric keyframe features via efficient indexing using a hash tree so as to avoid an exhaustive search of slides per video frame.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 2:
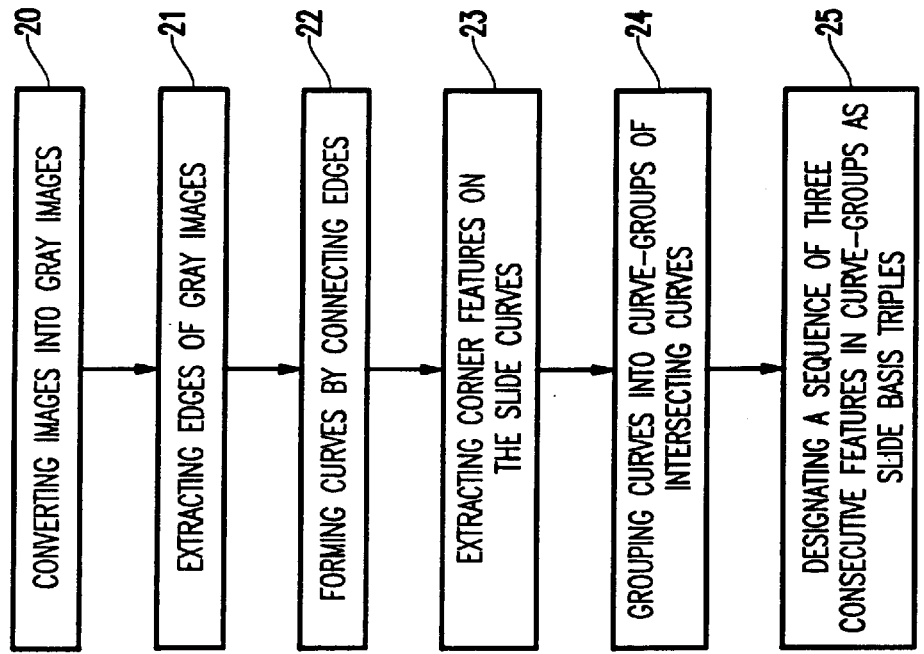
FIG. 2 is a flow chart of the steps involved in extracting the geometric slide features.

The present invention generally relates to matching slides or images contained in slides to their appearance in a video stream. The invention performs such matching by, first, generating a representation of the video stream as a set of keyframes. Next, in one embodiment, the invention identifies likely matches of electronic slide images and keyframes by color-matching the electronic slide and keyframe images. The invention extracts the geometric features of slide images and keyframe images. Lastly, the invention matches the keyframe images and slide images.

Thus, the invention matches slides supplied in electronic or other form, to their appearance in a video stream. This invention allows indexing for such events through natural language queries. The invention makes no assumptions on camera geometry. As a result, the invention is successful even when the slides appearing in video stream are partially occluded; color variations exist; and/or the content of slides is very similar. The invention also does not make assumption of presentation order in slides and can recognize them in any arbitrary order including recognizing their multiple occurrences in the video stream.

The invention takes, as input, a set of slides that were created in electronic form (using any conventional presentation program such as Powerpoint, Freelance Graphics, etc.) or color or black and white images of slides; and a video stream, and outputs the set of frames in the video stream along with the position in the frame where one of the electronic slides or images on the electronic slides are depicted.

As a preliminary step, the invention prepares the slides and video stream for matching. The invention generates slide images from the electronic slides. This can be done by extracting images from any conventional graphic presentation program using a method such as the one described by Niblack [Niblack, "Slide finder . . . ", in Proc. IEEE Workshop on Content-based Access of Image and Video Libraries, 1999, incorporated herein by reference]. The invention generates a set of keyframes from the video stream by processing the video stream to detect scene changes, cuts and different camera shots. The invention then separates the video stream into keyframes.

In other words, each time the scene changes in the video stream, the invention creates a still image of that portion of the video stream. In doing so, the invention divides the video stream into individual still images. This method affectively summarizes the video stream with a limited set of keyframes. Typically, a video stream will concentrate upon a specific feature for a period of time, after which a different feature becomes the subject of concentration. Thus, the invention creates a keyframe (or still image) of each feature which was the primary subject at some point during the video stream. As discussed below, the invention reviews each key frame to determine whether any of the slide images appear within any portion of the key frame.

Next, the invention performs a first comparison of the slides and keyframes. In one embodiment, the invention compares the background color of a given slide image to the keyframes and identifies regions of the keyframe in which the slide image background color was detected. In this embodiment, and the following processes (such as matching geometric features) are only performed on regions of the keyframes which have a background color corresponding to the background color of the slide image. This feature of the invention substantially increases the accuracy and speed of the inventive process by limiting the regions of the keyframes which are analyzed. However, in other embodiments, the invention can omit the process of matching background color if, for example, the user decides that a more thorough review of all aspects of the keyframes is more important than increasing the processing speed, or if it is determined that there is a poor color match between the video stream and the slides.

The invention also identifies geometric features of each slide image and the images contained in the identified regions of the keyframes. More specifically, the invention concentrates upon the intensity components of the images (e.g., by converting the images into gray images and retaining only the intensity component of the images). Then, the invention extracts edges from the intensity components. Edges generally occur where there is a sharp change in intensity.

Figure 5:
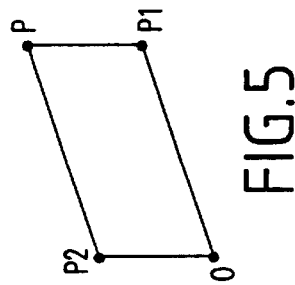
FIG. 5 is a schematic diagram illustrating an affine coordinate system.

The invention can then create line patterns (or "curves") by connecting the edges. Also, the invention identifies corner features, by locating places on the curves that have sharp changes in curvature. The corners serve as the basis features from which the geometric features for recognition are derived. A set of three such features forms a basis triple or an object-centered coordinate system in which positions of all other features can be expressed as affine coordinates as shown in FIG. 5. FIG. 5 shows affine coordinate of P with respect to (O,P1,P2).

Figure 6:
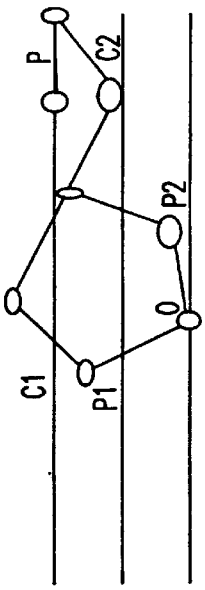
FIG. 6 is a schematic diagram illustrating curve-groups of basis triples.

The affine coordinates serve as the basis geometric features to characterize slides as well as keyframe images. The advantage of using affine coordinates as geometric features is that they are affine-invariant. That is, even when the slide appears in the keyframe in a skewed, rotated or scaled form, its geometric features with respect to corresponding basis triples will remain the same, leading to robust recognition. To restrict the number of basis triples and affine coordinates to a reasonable number, groups of curves are formed from the initial edge map using a suitable grouping constraint such as intersection, parallelism, etc. Then triplets of consecutive corners on single curves in curve-groups are chosen as basis triples. This ensures that there is only a linear number of basis triples as against the cubic number of basis triples that would exist otherwise. Next, the invention computes the affine coordinates of all corners on all curves in curve-groups with respect to the basis triples. The curve-group number of each corner is associated with the affine coordinate to serve as a geometric region identity for the affine coordinate feature which will be useful during the matching of slides to their appearance in keyframes. The choice of features to form basis triples and affine coordinates is illustrated in FIG. 6. FIG. 6 shows two curves (C1, C2) in a sample curve group. Note that the basis triple (O,P1,P2) is selected from consecutive features along the curve C1. The affine coordinates of points such as P on curve C2 are computed with respect to the basis triple (O,P1,P2) in C1.

Next, the invention arranges the slide image affine coordinates in a manner that permits a comparison between the slide image affine coordinates and the keyframe image affine coordinates. The invention places the slide image affine coordinates in a balanced binary search tree (called location hash tree) where each node in the tree includes the background color and an index of the affine coordinates e.g., (I1, I2), (Bi, Ij). Bi is a basis triple that gave rise to the affine coordinates represented by the index (I1, I2). Here Ij is the slide image from which the basis triple arises. This relies on the affine-invariant properties of the affine coordinates mentioned earlier. That is, the keyframe region showing a given slide will have the same set of affine coordinates for the corresponding visible features with respect to a corresponding basis triple. However, due to noise and occlusions, a corresponding basis triple may often be missing. To account for this, the scheme computes the affine coordinates of the slide with respect to more than one basis triples before storing them in the index structure.

The invention indexes the location hash tree using the keyframe image basis triples. As a result of the index, the invention creates a histogram of slide image basis triples hit, and a histogram of the corresponding slide images hit. Each keyframe is paired with the slide image with the most hits. The slide which contains the most hits for a given keyframe is identified as corresponding to the given keyframe.

In addition, not every keyframe may contain a slide. Therefore, the invention also includes a feature which monitors the minimum threshold of basis triple matches before a keyframe is considered to correspond to any of the slides. This minimum threshold can be varied by the user depending upon the accuracy required and the quality of the video image.

Figure 1:
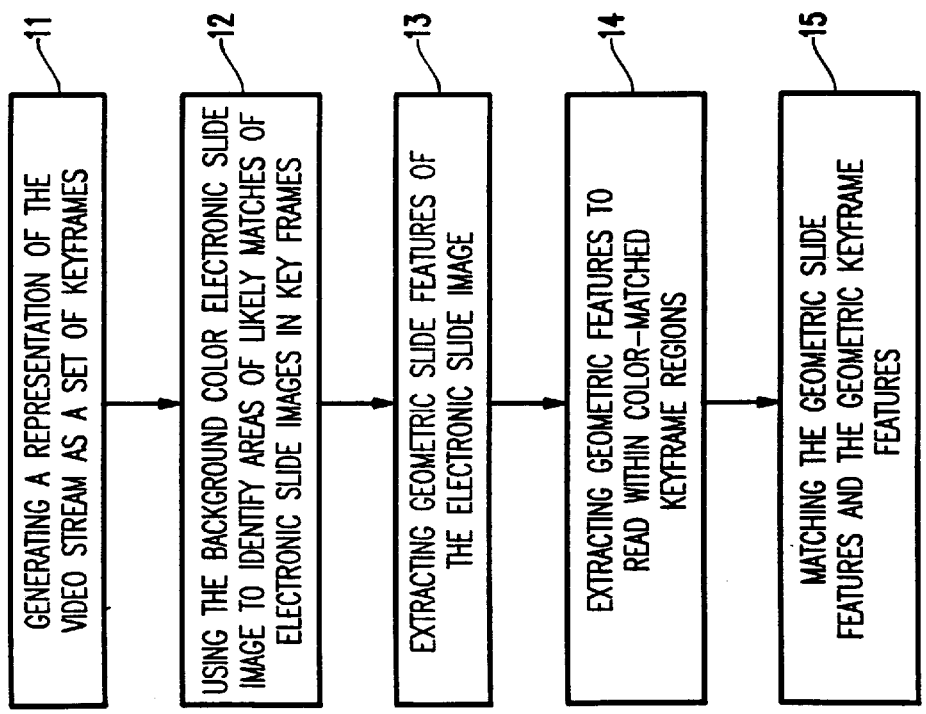
FIG. 1 is a flow chart depicted the overall steps of the matching electronic slide images and corresponding keyframe in a video stream.

Referring now to the drawings, FIG. 1 is a flow diagram illustrating one embodiment of the invention. In FIG. 1, the invention identifies likely matches of electronic slide images and video stream images by detecting differences in video stream images using a simple color histogram, 10; generating a representation of the video stream as a set of keyframes, 11; using the background color electronic slide image to identify areas of likely matches of electronic slide images in key frames, 12; extracting geometric slide features of the electronic slide image, 13; extracting geometric keyframe features of color matched keyframe images, 14; and, matching the geometric slide features and the geometric keyframe features, 15.

FIG. 2 illustrates an embodiment of the invention that performs a method of extracting geometric slide features by converting images into gray images, 20; extracting edges of gray images, 21; forming curves by connecting edges, 22; extracting corner features on the slide curves, 23; grouping curves into curve-groups of intersecting curves, 24; and designating a sequence of three consecutive features in curve-groups as slide basis triples, 25.

Figure 3:
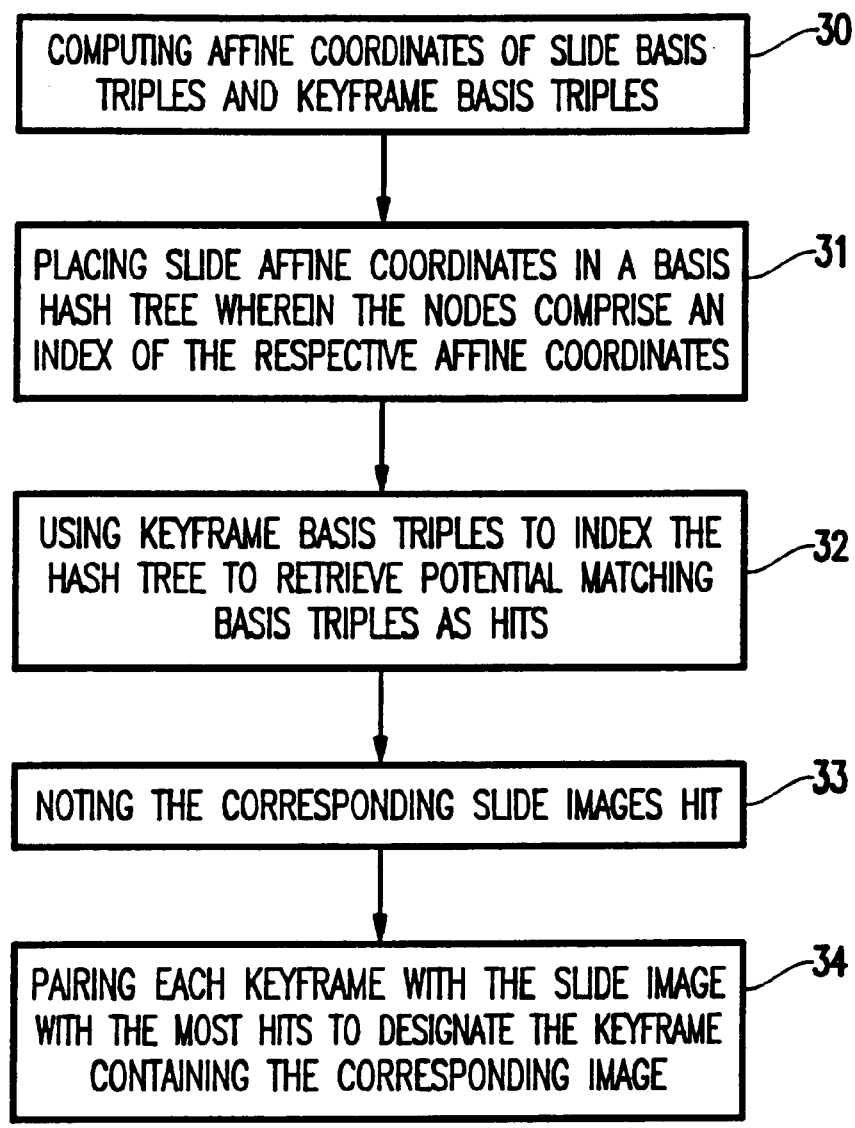
FIG. 3 is a flow chart of the steps involved in matching the geometric slide features and the geometric keyframe features.

FIG. 3 illustrates an embodiment of the invention that performs a method of computing affine coordinates of slide basis triples and keyframe basis triples, 30, places slide affine coordinates in a basis hash tree wherein the nodes comprise an index of the respective affine coordinates, 31, uses keyframe basis triples to index the hash tree to retrieve potential matching basis triples as hits, 32, notes the corresponding slide images hit, 33, and pairs each keyframe with the slide image with the most hits to designate the keyframe containing the corresponding image, 34.

Figure 4:
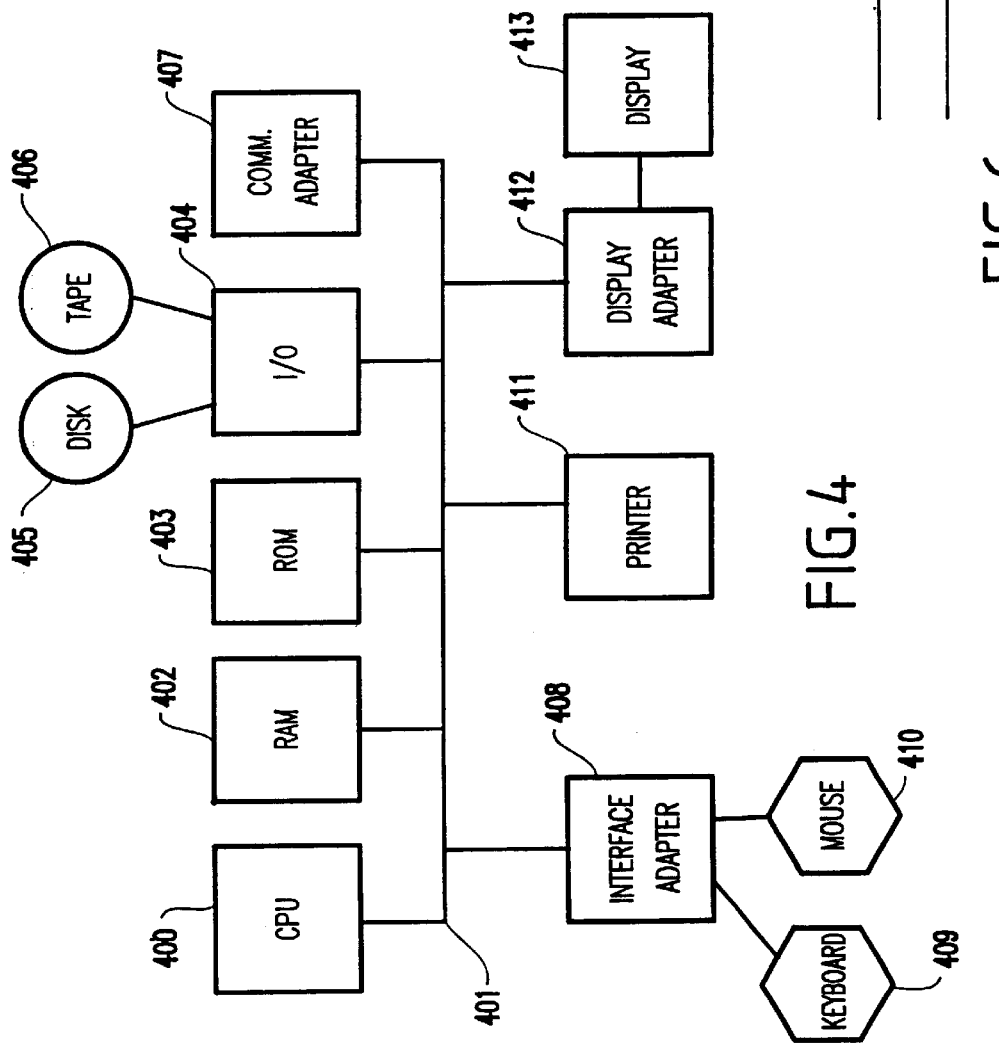
FIG. 4 is a schematic diagram of a hardware embodiment of the invention.

While the overall methodology of the invention is described above, the invention can be embodied in any number of different types of systems and executed in any number of different ways, as would be known by one ordinarily skilled in the art. For example, as illustrated in FIG. 4, a typical hardware configuration of an information handling/computer system in accordance with the invention preferably has at least one processor or central processing unit (CPU) 400. For example, the central processing unit 400 could include various image/texture processing units, mapping units, weighting units, classification units, clustering units, filters, adders, subtractors, comparators, etc. Alternatively, as would be known by one ordinarily skilled in the art given this disclosure, multiple specialized CPU=s (or other similar individual functional units) could perform the same processing, mapping, weighting, classifying, clustering, filtering, adding, subtracting, comparing, etc.

The CPU 400 is interconnected via a system bus 401 to a random access memory (RAM) 402, read-only memory (ROM) 403, input/output (I/O) adapter 404 (for connecting peripheral devices such as disk units 405 and tape drives 406 to the bus 401), communication adapter 407 (for connecting an information handling system to a data processing network) user interface adapter 408 (for connecting a peripherals 409–410 such as a keyboard, mouse, imager, microphone, speaker and/or other interface device to the bus 401), a printer 411, and display adapter 412 (for connecting the bus 401 to a display device 413). The invention could be implemented using the structure shown in FIG. 4 by including the inventive method, described above, within a computer program stored on the storage device 405. Such a computer program would act on an image supplied through the interface units 409–410 or through the network connection 407. The system would then automatically segment the textures and output the same on the display 413, through the printer 411 or back to the network 407.

The invention has several characteristics which make it innovative and advantageous. In particular, the use of a limited number of basis triples and affine coordinates together with the manner of computing affine coordinates across curve-groups greatly reduces the time required to perform the search and the amount of data that is generated and analyzed. The invention also optionally reduces the time required time to perform the search and the amount of data analyzed by first comparing the background colors of the keyframes and the slide image to detect potential slide image-containing regions in the keyframes. This allows the invention to isolate the potential slide image containing regions on the keyframes and analyze only the images in these regions rather than the entire key frame.

The use of affine coordinates allows definition of the images in relation to the image itself, rather than a set of cartesian coordinates or points on the slide or keyframe. As a result, the invention permits searching for and recognizing an image at any location on the slide or key frame. The invention also reduces the potential for missing a partially occluded image on a keyframe. The feature extraction portion of the invention includes a built-in redundancy in the location hash tree.

The invention is useful with a wide variety of video identification procedures. For example, certain text (e.g., captions, etc.) can be associated with each of the slides. After the invention matches the slides to portions of the video, a natural language query of the captions can locate regions of the video stream where such topics were most likely discussed. Additionally, the invention allows graphic searching of the slides. For example, a graphic user interface may present the user with multiple slides. As the user selects (or clicks on) each of the slides (using a conventional pointing device, such as a mouse, etc.) the graphic user interface can retrieve video clips of the video stream where the slide that was selected by the user appears. In addition, the invention can be used in combination with other systems which coordinate many different media forms, including text, audio, video, slides, etc.

While the invention has been described in terms of preferred embodiments, those skilled in the art will recognize that the invention can be practiced with modification within the spirit and scope of the appended claims.

What is claimed is:

1. A method for matching slides to video comprising:
    generating keyframes from said video;
    extracting geometric keyframe features from said keyframes and geometric slide features from said slides by reducing a structure of said geometric keyframe features and said geometric slide features to a corresponding set of affine coordinates;
    placing said affine coordinates in a search tree; and
    matching said geometric slide features and said geometric keyframe features by indexing said search tree and making comparisons of said geometric slide features and said geometric keyframe features through any of natural language queries and graphic searching.

2. The method in claim in claim 1, further comprising identifying background matching regions in said keyframes having colors matching colors of backgrounds in said slides.

3. The method in claim 2, wherein said extracting of said geometric keyframe features is performed only in said background matching regions.

4. The method in claim 1, wherein said matching identifies which slide of said slides has a highest number of geometric slide features matching geometric keyframe features in a keyframe of said keyframes.

5. The method in claim 1, wherein said extracting includes:
    identifying changes in image intensity as edges;
    forming curves connecting said edges;
    identifying corners where said curves change direction;
    grouping said curves into curve-groups; and
    designating a sequence of three consecutive features in each of said curve-groups as basis triples.

6. The method in claim 5, wherein said matching comprises:
    computing coordinates of said basic triples; and
    identifying which slide of said slides has a highest number of basis triples matching basis triples in a keyframe of said keyframes.

7. The method in claim 1, wherein said generating of said keyframes comprises:
    dividing said video into portions based upon scene changes; and
    selecting one frame from each portion of said video as a keyframe.

8. A method identifying slides that appear in a video comprising:
    generating keyframes from said video;
    identifying background matching regions in said keyframes having colors matching colors of backgrounds in said slides;
    extracting geometric keyframe features from said background matching regions in said keyframes and geometric slide features from said slides by reducing a structure of said geometric keyframe features and said geometric slide features to a corresponding set of affine coordinates;
    placing said affine coordinates in a search tree; and
    matching said geometric slide features and said geometric keyframe features by indexing said search tree and making comparisons of said geometric slide features and said geometric keyframe features through any of natural language queries and graphic searching.

9. The method in claim 8, wherein said extracting of said geometric keyframe features is performed only in said background matching regions.

10. The method in claim 8, wherein said matching identifies which slide of said slides has a highest number of geometric slide features matching geometric keyframe features in a keyframe of said keyframes.

11. The method in claim 8, wherein said extracting includes:
    identifying changes in image intensity as edges;
    forming curves connecting said edges;
    identifying corners where said curves change direction;
    grouping said curves into curve-groups; and
    designating a sequence of three consecutive features in each of said curve-groups as basis triples.

12. The method in claim 11, wherein said matching comprises:
    computing coordinates of said basis triples; and
    identifying which slide of said slides has a highest number of basis triples matching basis triples in a keyframe of said keyframes.

13. The method in claim 8, wherein said generating of said keyframes comprises:
    dividing said video into portions based upon scene changes; and
    selecting one frame from each portion of said video as a keyframe.

14. A program storage device readable by machine tangibly embodying a program of instructions executable by the machine to perform a method for matching slides to video, said method comprising:
    extracting geometric keyframe features from said keyframes and geometric slide features from said slides by reducing a structure of said geometric keyframe features and said geometric slide features to a corresponding set of affine coordinates;
    placing said affine coordinates in a search tree; and
    matching said geometric slide features and said geometric keyframe features by indexing said search tree and making comparisons of said geometric slide features and said geometric keyframe features through any of natural language queries and graphic searching.

15. The program storage device in claim 14, further comprising identifying background matching regions in said keyframes having colors matching colors of backgrounds in said slides.

16. The program storage device in claim 15, wherein said extracting of said geometric keyframe features is performed only in said background matching regions.

17. The program storage device in claim 14, wherein said matching identifies which slide of said slides has a highest number of geometric slide features matching geometric keyframe features in a keyframe of said keyframes.

18. The program storage device in claim 14, wherein said extracting includes:
    identifying changes in image intensity as edges;
    forming curves connecting said edges;
    identifying corners where said curves change direction;
    grouping said curves into curve-groups; and
    designating a sequence of three consecutive features in each of said curve-groups as basis triples.

19. The program storage device in claim 18, wherein said matching comprises:
    computing coordinates of said basis triples; and
    identifying which slide of said slides has a highest number of basis triples matching basis triples in a keyframe of said keyframes.

20. The program storage device in claim 14, wherein said generating of said keyframes comprises:
    dividing said video into portions based upon scene changes; and
    selecting one frame from each portion of said video as a keyframe.

21. A method for matching slides to video comprising:
    generating keyframes from said video;
    extracting geometric keyframe features from said keyframes and geometric slide features from said slides; and
    matching said geometric slide features and said geometric keyframe features, wherein said extracting includes:
        identifying changes in image intensity as edges;
        forming curves connecting said edges;
        identifying corners where said curves change direction;
        grouping said curves into curve-groups; and
        designating a sequence of three consecutive features in each of said curve-groups as basis triples, and wherein said matching comprises:
            computing coordinates of said basis triples; and
            identifying which slide of said slides has a highest number of basis triples matching basis triples in a keyframe of said keyframes.

22. A method identifying slides that appear in a video comprising:
    generating keyframes from said video;
    identifying background matching regions in said keyframes having colors matching colors of backgrounds in said slides;
    extracting geometric keyframe features from said background matching regions in said keyframes and geometric slide features from said slides; and
    matching said geometric slide features and said geometric keyframe features, wherein said extracting includes:
        identifying changes in image intensity as edges;
        forming curves connecting said edges;
        identifying corners where said curves change direction;
        grouping said curves into curve-groups; and
        designating a sequence of three consecutive features in each of said curve-groups as basis triples, and wherein said matching comprises:
            computing coordinates of said basis triples; and
            identifying which slide of said slides has a highest number of basis triples matching basis triples in a keyframe of said keyframes.

23. A program storage device readable by machine tangibly embodying a program of instructions executable by the machine to perform a method for matching slides to video, said method comprising:
    generating keyframes from said video;
    extracting geometric keyframe features from said keyframes said geometric slide features from said slides; and
    matching said geometric slide features and said geometric keyframe features, wherein said extracting includes:
        identifying changes in image intensity as edges;
        forming curves connecting said edges;
        identifying corners where said curves change direction;
        grouping said curves into curve-groups; and
        designating a sequence of three consecutive features in each of said curve-groups as basis triples, and wherein said matching comprises:
            computing coordinates of said basis triples; and
            identifying which slide of said slides has a highest number of basis triples matching basis triples in a keyframe of said keyframes.

* * * * *